A. WIERSZEWSKA.
FURNITURE CASTER.
APPLICATION FILED SEPT. 21, 1917.

1,265,850.

Patented May 14, 1918.

Inventor
A. Wierszewska

By A. M. Wilson
Attorney

UNITED STATES PATENT OFFICE.

ANNA WIERSZEWSKA, OF WEIRTON, WEST VIRGINIA.

FURNITURE-CASTER.

1,265,850.                     Specification of Letters Patent.     Patented May 14, 1918.

Application filed September 21, 1917. Serial No. 192,467.

*To all whom it may concern:*

Be it known that I, ANNA WIERSZEWSKA, a subject of the Emperor of Austria, residing at Weirton, in the county of Hancock and State of West Virginia, have invented certain new and useful Improvements in Furniture-Casters, of which the following is a specification.

The primary object of the invention is the provision of a caster having universal movement and arranged with anti-frictional mounting means adjustably and detachably positioned with respect to the traction member of the device.

A further object of the device is to provide a ball caster in which the traction member is readily releasable as well as adjustable when the caster is detached from the furniture, and is locked in position when the device is in its operative arrangement.

A still further object of the invention is the provision of a ball caster having anti-friction means for substantially supporting the load thereon and also having laterally arranged positioning anti-friction members adjustably and detachably positioned with respect to the traction ball.

In the drawing forming a part of this application and in which like reference characters designate corresponding parts throughout the several views.

Figure 1:
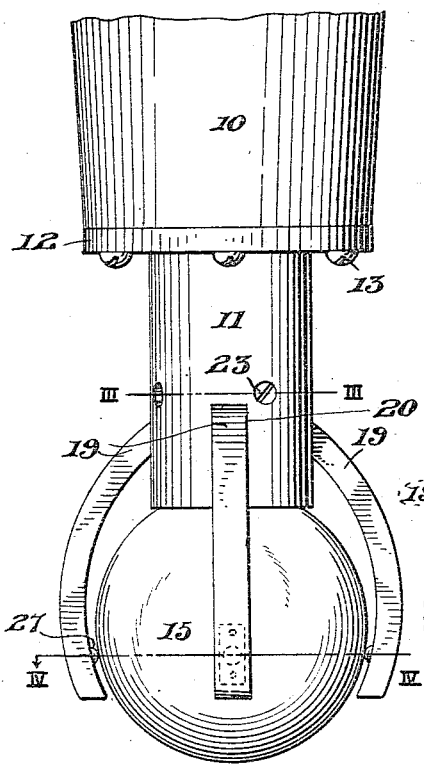
Figure 1 is a side elevation of the device operatively arranged upon a furniture leg.

It being understood that my caster is designed for use in connection with any article such as a piece of furniture the same is herein illustrated in Fig. 1 operatively mounted upon the bottom of a table leg 10. A post 11 is arranged with a flange 12 adapted for attachment to an article such as the leg 10 by means of screws 13 arranged through perforations 14 in the flange and projecting into the bottom of the leg.

A traction ball 15 adapted for supporting the load which is carried by the caster is anti-frictionally positioned beneath the post 11, the latter being seated thereon by means of a concaved lower face 16 of the post which face is arranged with anti-friction ball-bearings 17 secured in position by a retaining plate 18. Arcuate arms 19 are provided for maintaining the traction ball 15 in its operative position, the said arms projecting through slots 20 in the sides of the post 11 and being pivotally mounted within a chamber 21 in said post by means of screws 22. It will be seen that the screws 22 are provided with smooth journaling portions 23 which extend through the arms 19 while the screws are removable and are positioned perpendicular each other.

Extensions 24 are provided upon the arms 19 within the chamber 21, the said extensions being slightly curved and upwardly diverging for the accommodation therebetween of a conical adjusting screw 25 threaded through a bore 26 in the flanged end of the post 11.

Figure 2:
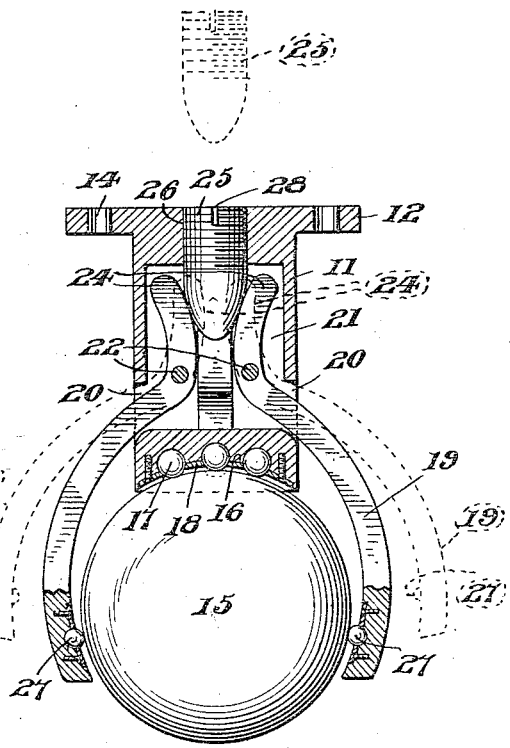
Fig. 2 is a central longitudinal sectional view of the device, the same being illustrated by dotted lines in its released arrangement.
Figure 3:
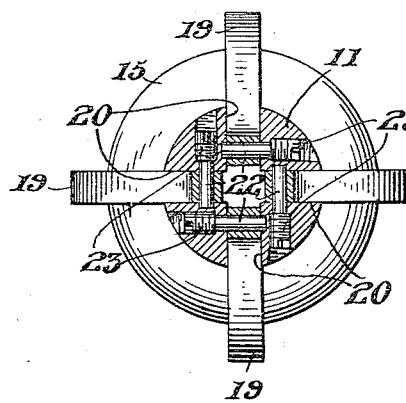
Figs. 3 and 4 are transverse sectional views taken upon lines III—III and IV—IV respectively of Fig. 1.
Figure 4:
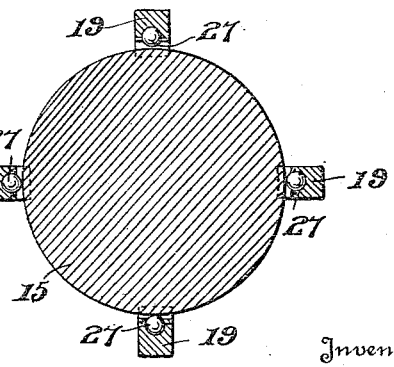

The operation of the device will be apparent from the arrangement of its elements as hereinbefore set forth, it being noted that when the device is detached from any member which it is designed to support, the screw 25 may be removed from the post 11 for permitting the outward swinging movement of the arms 19 and releasing the ball 15 as illustrated by dotted lines in Fig. 2 of the drawing. The screw 25 may then be inserted within the bore 26 of the post 11 and upon being screwed inwardly of the chamber 21 the extensions 24 are engaged by the screw thereby forcing the lower free ends of the arms 19 toward the ball 15 and engaging the anti-friction ball-bearings 17 which are upon the inner faces of the said arms against the ball 15. It will be understood that the arms 19 may be adjusted by means of the screw 25 for maintaining the ball 15 with the desired amount of "play" for its operation, the weight to be placed upon the traction ball 15 being mainly exerted through the anti-friction bearings 17 of the post 11. When the caster is secured to the leg 10, it will be seen that the screw 25 cannot be turned either accidentally or intentionally as the screw is not accessible. A kerf 28 is preferably provided in the screw 25 for turning the same when the caster is removed from the leg 10. A strong and serviceable structure is arranged for supporting heavy weights and in which the traction member is anti-frictionally mounted as well as readily removable and detachable when found desirable.

What I claim as new is:—

1. A caster comprising a post having a chamber therein and entrance slots in the sides thereof, arms depending from said post pivotally mounted within the chamber thereof and extending through the said slots, and a traction ball arranged beneath said post between the said arms.

2. A caster comprising a post having a chamber therein and entrance slots in the sides thereof, arms depending from said post pivotally mounted within the chamber thereof and extending through the said slots, a traction ball arranged beneath said post between the said arms, adjusting means for the arms carried by the post, and anti-friction means between the ball and the said post and arms.

3. A caster comprising a post having a chamber therein and entrance slots in the sides thereof, arms depending from said post pivotally mounted within the chamber thereof and extending through the said slots, a traction ball arranged beneath said post between the said arms, extensions upon the said arms within the said chamber, a conical screw adjustably carried by the post projecting within said chamber between the said extensions, and anti-friction means between the bottom of the post to the traction ball.

4. A caster comprising a post having a conical face at one end and a flange at its opposite end and arranged with a chamber in communication with side slots and with a central bore at the flanged end of the post, anti-friction members arranged in the bottom of the post, a retaining plate for the said anti-friction members, a traction ball arranged beneath the post in contact with said anti-friction members, curved arms pivoted within said chamber and extending through the said slots terminating laterally of said ball and arranged with diverging curved extensions within the said chamber, and a conical screw positioned within said bore adjustably arranged between and in contact with the said extensions.

In testimony whereof I affix my signature.

ANNA WIERSZEWSKA.